Aug. 28, 1956  D. M. RICHNER  2,760,812
REMOVABLE STAKE HINGES FOR TRUCK BODIES
Filed Feb. 4, 1954

INVENTOR.
DWIGHT M. RICHNER
BY
ATTORNEY

United States Patent Office 2,760,812
Patented Aug. 28, 1956

2,760,812

REMOVABLE STAKE HINGES FOR TRUCK BODIES

Dwight M. Richner, Colorado Springs, Colo.

Application February 4, 1954, Serial No. 408,268

2 Claims. (Cl. 296—43)

This invention relates to an automobile truck body and more particularly to bodies of the type known as stake bodies. Bodies of this type are provided with stake sockets into which vertical stakes supporting horizontal slats can be inserted to increase the load-carrying capacity of the truck body.

The principal object of this invention is to provide a hingedly mounted stake socket for receiving the stakes of a stake body which will allow the stake and the slat structure supported by the stakes to be swung inwardly over the truck body, vertically alongside the truck body, and outwardly at a flaring angle from the sides of the truck body to accommodate any desired type and size of load, and to so construct the improved, hinged stake socket so that it can be quickly and easily installed in the stake sockets of a conventional truck body without requiring use of tools.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

Figure 1:
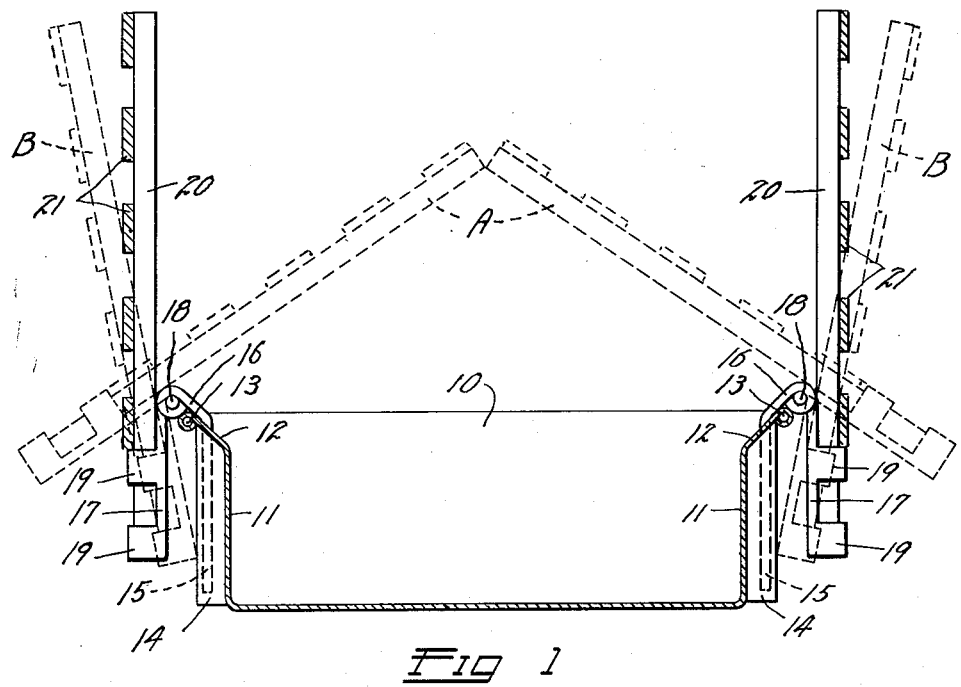
Fig. 1 is a cross-section through a conventional truck body of the "pick-up" type, illustrating the invention in place thereon.
Figures 2, 3:
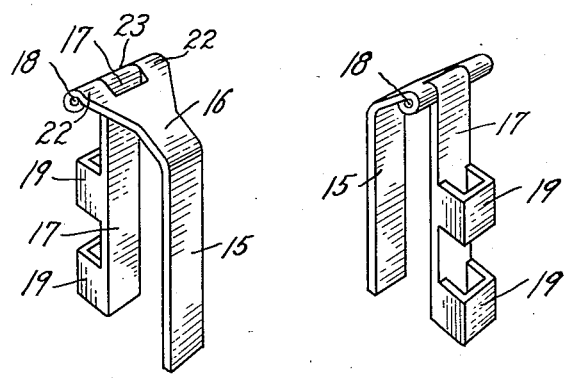
Fig. 2 is a perspective view of the improved hinged stake socket, looking toward the inner side thereof.
Fig. 3 is a similar perspective view, looking toward the outer side of the improved hinged stake socket.

A conventional truck body of the "pick up" type is indicated at 10. Such a body is provided with fixed vertical sides 11 having outwardly flared upper portions 12 terminating in a strengthening bead or roll 13. Bodies of this type are provided with vertical stake sockets 14 secured to the exterior of the sides 11 and communicating through stake holes in the flared upper portions 12. The sockets are for the purpose of receiving vertical body stakes 20 carrying side slats 21.

The improved hinged stake socket is designed to be installed into the present stake sockets 14 through the stake holes in the flaring portions 12 and is designed to receive and support the body stakes 20.

The improved hinged socket employes a straight vertical leg member 15 adapted to be inserted in one of the stake sockets 14 of the body 10. The leg member is preferably formed with a slightly less width than the width of the sockets 14 so that it may easily slide therewithin and snugly engage the walls thereof.

The upper extremity of the leg 15 is formed with an outwardly inclined portion 16, the angular incline of which substantially corresponds to the angular incline of the flared portion 12 of the body 10. The extremity of the inclined portion 16 is bifurcated and rolled to form two aligned, spaced-apart hinge pin tubes 22 and the upper extremity of a stake arm 17 is similarly rolled to form a similar hinge pin tube 23 positioned between the spaced-apart tubes 22. A hinge pin 18 extends through the aligned tubes 22 and 23 to hingedly mount the stake arm 17 on the vertical leg member 15.

The stake arm 17 is provided with two vertically-spaced stake bands or sockets 19 which extend outwardly from the stake arm in a rectangular U-shape to receive the body stake 20.

The device is installed upon the body 10 by simply slipping the vertical leg members of the improved hinged stake sockets into the conventional stake sockets 14 so that the outwardly inclined portions 16 will lie on the flared upper portions 12 of the body and the pins 18 will be supported in aligned relation upwardly and outwardly from the body reinforcing rolls 13, with the stake arms 17 freely depending therefrom. The body stakes 20 are then inserted in the stake sockets 19 instead of their former sockets 14. This allows the sides of the body to be swung inwardly, as indicated in broken line on the drawing at "A," to form a cover over the body 10, or outwardly, as similarly indicated at "B," to support a flaring load of light material, such as hay, straw, or the like.

Ordinarily the stakes will be supported in the usual vertical position, as shown in solid line in Fig. 1, by the conventional slotted front and tail gates with which stake bodies of this type are provided.

Should it be desired to remove the improved hinged stake sockets from the body, it is only necessary to lift them from the sockets 14 and reinsert the body stakes 20 into the original sockets 14.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. A stake support for vehicle bodies comprising: a vertical leg portion adapted to be inserted in a stake socket on said body; an angularly inclined turned upper extremity on said leg portion, the width of said extremity being increased beyond the width of said leg portion; a stake arm mounted in a medial notch in said inclined portion; a hinge pin hingedly mounting said stake arm in its notch, said stake arm being of substantially the same width as said leg portion; and two vertically spaced-apart stake-enclosing bands secured to and projecting outwardly from the outer face of said stake arm in vertical alignment to form a stake-receiving socket thereon.

2. A stake support for a vehicle body having vertical stake sockets comprising: a vertical leg portion adapted to be inserted in one of said vehicle stake sockets; an angularly inclined upper portion on said leg portion extending outwardly and upwardly therefrom; a stake arm hingedly depending from the extremity of said inclined portion; and two vertically spaced-apart stake-enclosing bands secured to and projecting outwardly from the outer face of said stake arm in vertical alignment to form a stake-receiving socket thereon.

References Cited in the file of this patent

UNITED STATES PATENTS

| 622,538 | Rice | Apr. 4, 1899 |
| 641,347 | Thompson | Jan. 16, 1900 |
| 835,881 | Cleveland | Nov. 13, 1906 |

FOREIGN PATENTS

| 377,252 | Germany | June 13, 1923 |